Feb. 26, 1963  E. D. DUKE ETAL  3,079,176
PUSH BUMPER FOR VEHICLES
Filed Jan. 3, 1961  2 Sheets-Sheet 1
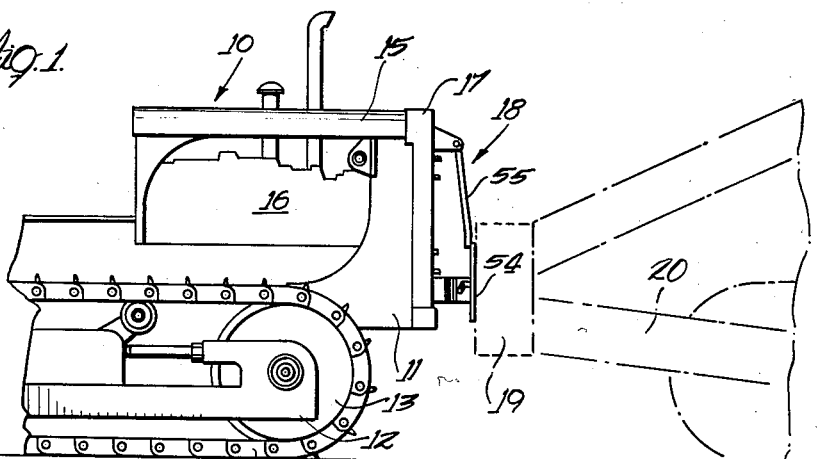
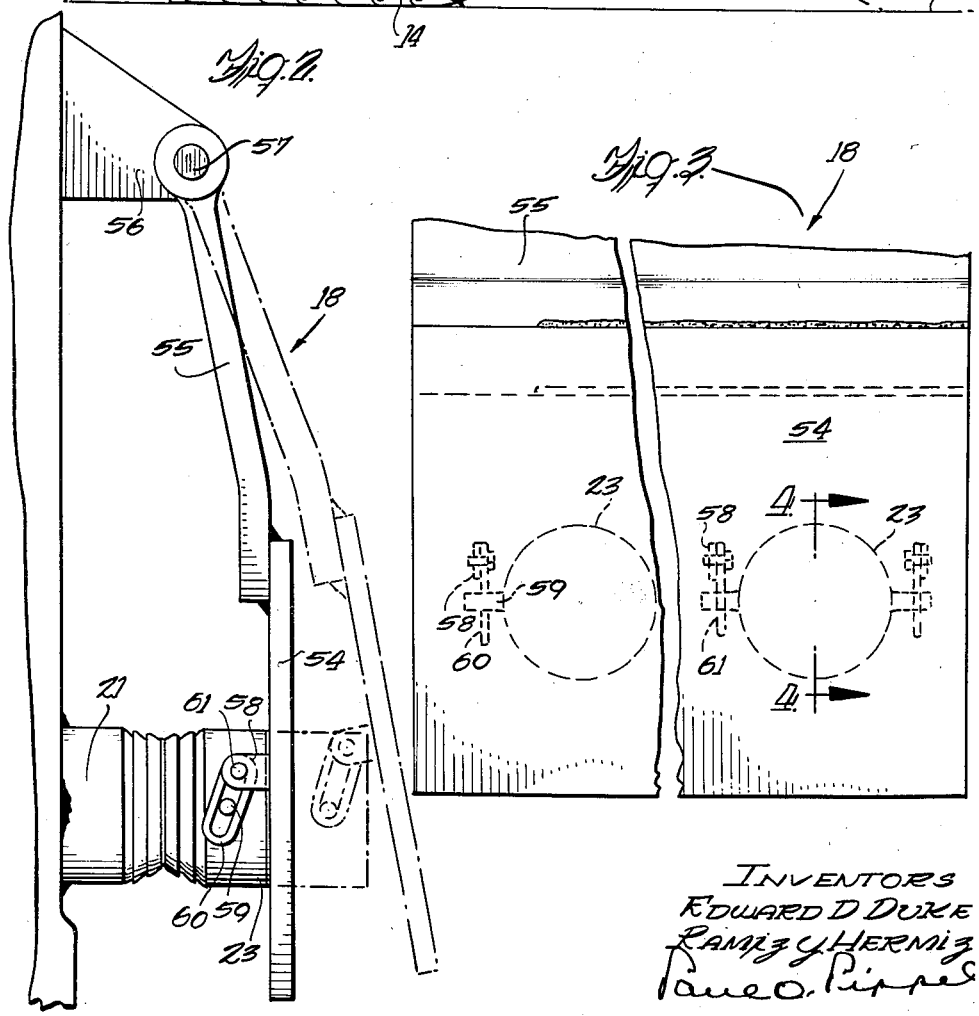
INVENTORS
EDWARD D DUKE
RAMZY HERMIZ
ATTORNEY

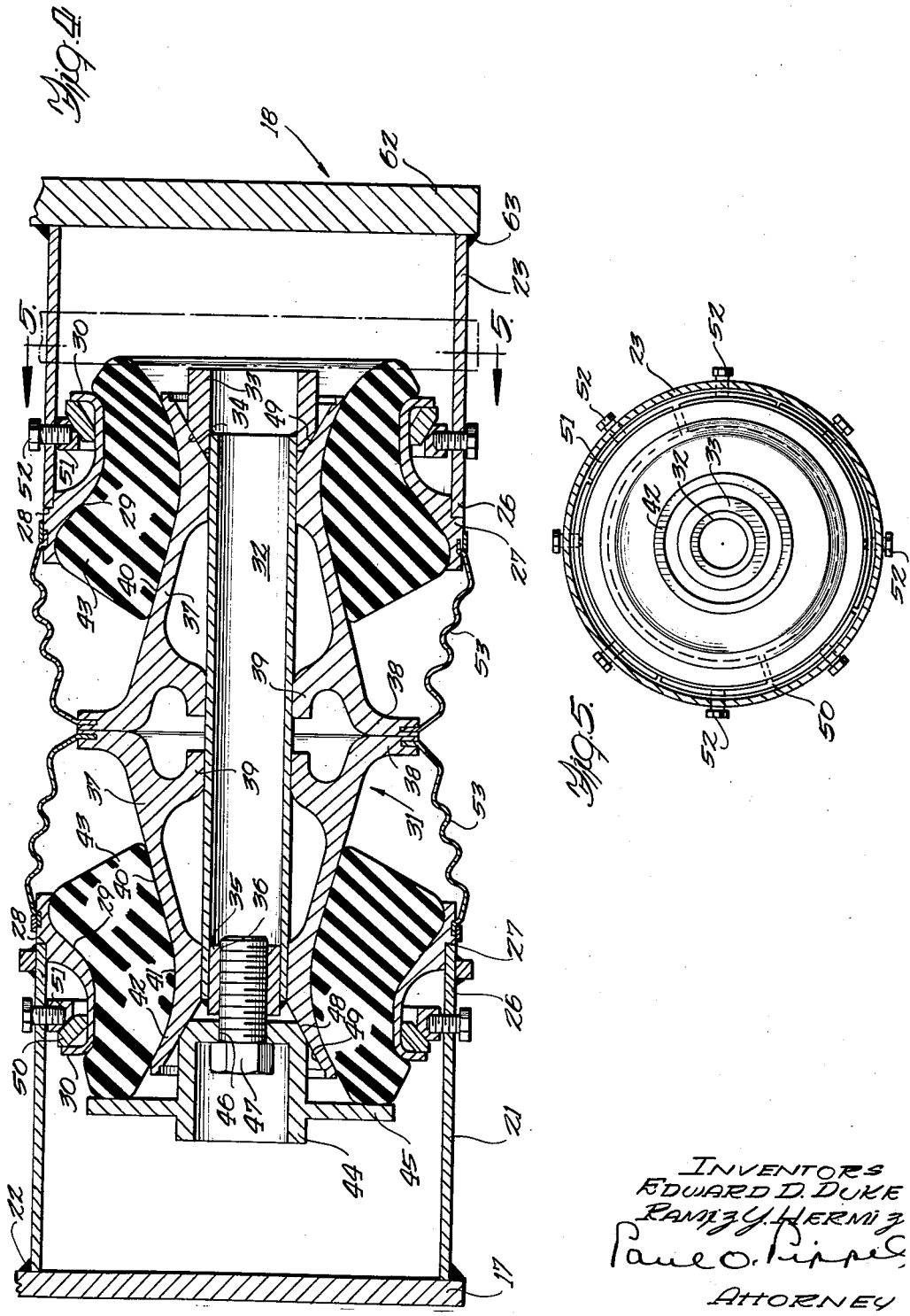

United States Patent Office                              3,079,176
                                                   Patented Feb. 26, 1963

3,079,176
PUSH BUMPER FOR VEHICLES
Edward D. Duke, Chicago, and Ramiz Y. Hermiz, Maywood, Ill., assignors to International Harvester Company, Chicago, Ill., a corporation of New Jersey
Filed Jan. 3, 1961, Ser. No. 80,119
1 Claim. (Cl. 280—481)

This invention relates to vehicle bumpers. More specifically, the invention relates to a bumper structure particularly suited for pusher-type vehicles.

The present invention is particularly adapted for vehicles used in a pushing operation. In the earthmoving field, for instance, it is frequently necessary, during the loading operation of a scraper, to use a crawler type vehicle which engages the bumper structure of a scraper thereby acting as an auxiliary power unit at the time when such power is needed. Or frequently the filled scraper may have to be pushed up an incline and usually crawler tractors are made available to assist the scraper during such contingencies. In particular instances where the scraper may be loading, its forward movement may be almost halted and the crawler tractor then is driven into engagement with the rear bumper structure of the scaper to assist until the loading is completed. Normally the crawler tractor operator must slow down his forward movement so that the impact against the rear end of the scraper is not too great to cause damage or injury. Thus the crawler tractor operator must maneuver so that the shock of engagement is minimized and this necessarily requires additional time and effort, thus greatly delaying the loading or pushing operation. Also, since the impetus of the forward movement of the crawler must be slowed, the effectiveness of the crawler's ability to push also may be somewhat reduced. It is a prime object of this invention, therefore, to provide an improved push bumper construction for utilization in connection with a vehicle, the said bumper permitting relatively fast engagement of the vehicle with the object to be pushed without undesirable results due to the initial impact of the bumper structure.

Still another object of the invention is to provide an improved bumper structure for vehicles wherein the cushioning effect is efficient to absorb the extreme shocks and impacts resulting from the engagement of the bumper structure with a vehicle to be pushed during rapid movement of the vehicle containing the said bumper structure.

A still further object is to provide an improved push bumper structure for crawler type vehicles, the said structure being particularly adapted to absorb and cushion severe impact loading and having a high and speedy recovery rate so that the structure will withstand the constant usage which is required in connection with this type of operation.

A still further and more specific object of the invention is to provide an improved push bumper construction including a plurality of tubular members which are interconnected by means of a central core having positioned thereon a plurality of biscuit-type rubber elements connected to the said tubular members and providing cushioning means for cushioning the impact loads of a bumper plate when it engages an object to be pushed.

These and further objects will become more readily apparent from a reading of the description when examined in connection with the accompanying sheets of drawings.

In the drawings:

FIG. 1 is a side elevational view of the front portion of a crawler type tractor having an improved push bumper construction connected thereto;

FIG. 2 is an enlarged side elevational view of a preferred push bumper construction connected to the forward end of a crawler type vehicle;

FIG. 3 is a fragmentary front elevational view of a push bumper construction;

FIG. 4 is an enlarged cross-sectional view of the cushioning elements of a push bumper construction showing a modified bumper plate connected thereto; and FIG. 5 is a cross-sectional view taken along the line 5—5 of FIG. 4.

The present push bumper construction is particularly adaptable for use with a crawler type tractor the front portion of which is shown in FIG. 1 and is designated generally by the reference character 10. The crawler 10 comprises a main frame 11 which is supported on a track frame 12. The forward end of the track frame 12 is suitably supported by means of sprockets 13 in turn supported on a track chain 14. The crawler 10 includes an engine housing 15 and an engine 16 which may be of conventional construction and design. The forward end of the housing 15 is suitably protected by a heavy structural casting or vertical frame 17 which suitably protects the radiator structure during operation of the crawler tractor.

A bumper structure, as shown in FIGS. 1 and 2, is generally referred to by the reference character 18. The preferred bumper structure 18 is shown in FIGS. 1, 2 and 3, while FIG. 4 shows a slightly modified bumper structure 18, as will be described below. In FIG. 1 the push bumper structure 18 is shown engaging the rear bumper structure 19 of a scraper 20 for assisting in the forward movement of the said scraper 20.

Referring now to FIGS. 4 and 5, the bumper structure 18 of both the preferred embodiment and the modification includes a first tubular member 21 which is rigidly secured to the vertical frame 17 by means of welding as indicated at 22. A second tubular member 23 is axially spaced with respect to the first tubular member 21 and the tubular members 21 and 23 are provided with opposed ends indicated at 26. A retainer ring 27 is secured to each of the opposed ends 26, the retainer rings 27 being identical in construction but being positioned in opposed or in back-to-back relation. Each retainer ring 27 is provided with an undercut 28 which is engaged by the opposed ends 26 of the tubular members. Each retainer ring 27 is provided with an annuar inner surface 29 which slopes downwardly or inwardly from a relatively large diameter annulus to a relatively smaller diameter annulus. The position of the rings 27 is such that the surfaces 29 of each ring slope in a direction away with respect to the other. Each retainer ring 27 is also provided with an outwardly extending flange 30.

A core 31 is disposed concentrically within the tubular members 21 and 23. The core 31 includes a tube 32 having at one end a collar 33 secured thereto. The collar 33 is provided with an annular taper 34. A block 35 is secured to the other end of the tube 32 and includes a threaded bore 36. The tube 32 supports a pair of hubs or core members 37 which are, like the retainer rings 27, positioned in back-to-back relation. The core members 37 are identical and each includes a peripherally extending flange 38 and as shown in FIG. 4 the said flanges are in adjacent engaging relation. Each hub 37 is provided with internal supporting collars 39 suitably engaging the tube 32 in supported relation. The core members 37 are each provided with outer annular tapering surfaces 40, the said surfaces tapering inwardly toward the axis until and including arcuate portions 41 which terminate in flanges which are flared upwardly and outwardly. The flanges 42 are provided, relative to the rings 27, at their smaller annulus as indicated. Also as indicated, the surfaces 40 slope in opposite direction because of the back-to-back relation of the core members 37.

A pair of annular biscuit-type rubber members are indicated at 43. The members 43 may be of any suitable elastomeric material having good shock-absorbing and quick recovery characteristics. The biscuits 43 are suitably supported or may be bonded to the surfaces 40 and are tensioned between the said surfaces 40 and the surfaces 29 to which they may or may not also be bonded. Thus the biscuits 43 resiliently support the core 31.

A stop and connecter element is designated at 44 and includes a flange 45 which engages, as shown in FIG. 4, the lefthand biscuit-type member 43 to limit the longitudinal outward movement of the tubular member 23. The stop 44 is also provided with a bore 46 and a screw 47 secures the stop 44 to the tube 32, the said screw being threaded into the bore 36. The stop 44 also includes an annular taper 48 which engages an annular frusto-conical taper 49 provided on the flanges 42. As shown in FIG. 4, the righthand core member 37 has the tapered annular surface 49 in engagement with the taper 34 of the collar 33. Thus upon tightening of the screw 47, the members 37 are tightly secured in the relationship shown.

The type of bumper structure shown is subjected to tremendous forces and thus a reinforcing or clamping arrangement is provided. The arrangement comprises a pair of clamping segments 50 which are supported by the rings 27 at the flanges 30. A plurality of arcuate segments 51 form a ring and are movable inwardly by means of bolts 52 extending through the tubular members 21 and 23. Thus the segments 51 are moved into tight clamping engagement with respect to the clamping ring segments 50 which thus reinforce the retainer ring 27 against the loads to which it is subjected.

Flexible covers 53 are suitably supported on the flanges 38 and on the ends 26 of the tubular members to provide a covering means against the entrance of dirt, etc.

As shown in FIGS. 1, 2 and 3, the tubular elements 23 may be engaged by a bumper plate 54 which is welded to a hinge plate 55 in turn suitably pivoted on a bracket 56 by means of a transversely extending pivot pin 57.

Depending upon the force of the impact to which the bumper plate 54 is subjected, a predetermined number of the structures shown in FIG. 4 may be utilized. For instance in FIG. 3, two of the structures are shown though it may be necessary to add additional structures to the radiator frame 17 to accommodate the forces. The bumper plate 54 has a limited movement with respect to the tubular member 23 by means of ears 58 attached to the rear of the bumper plate 54. Each tubular member 23, in the preferred embodiment, may have outwardly projecting pins 59 which engage a slotted link 60 which is pivotally connected to each ear 58 by means of a hinge pin 61. Thus the plate 54 may have limited movement with respect to the tubular members 23.

In the operation, the scraper 20 may be stationary or may be moving at a slow rate of speed. The crawler tractor at a much greater speed will move toward the rear of the scraper and the bumper plate 54 will engage the bumper 19 of the scraper while the tractor is traveling at a relatively higher speed. The scraper 20 will not be jarred but will immediately be assisted in movement since the cushioning effect of the resilient biscuits 43 absorbs the severe impact forces. Engagement of the plate 54 with the tubular members 23 causes rearward movement of the core 31 and the biscuits 43 are resiliently compressed by virtue of the shape of the surfaces 29 and 40. The stop 44 upon engagement with the vertical frame member 17 prevents further movement, but this engagement 44 may be only in extreme conditions. The shape of the biscuits 43 and the relationship of the surfaces 29 and 40 provides for a quick recovery and a high degree of cushioning during the impact of the structure. The clamping ring segments and segmental clamps 51 upon tightening of the screws 52 prevent any deformation and keep the rings 27 properly in round and in alignment.

The preferred embodiment has been shown in FIGS. 1 through 3 insofar as the bumper plate structure is concerned. In FIG. 4 a bumper plate 62 is rigidly connected by means of welding 63 to the tubular members 23 and the hinging action afforded by the plate shown in FIGS. 1 through 4 is not included. In other words, the structure shown in FIG. 4 is identical for both embodiments of the invention, but in one case a plate 62 may be rigidly connected to the tubular elements 23 and in the other case the plate structure shown in FIGS. 1 through 4 may be utilized with the bumper structure.

As indicated above, one or more of the structures shown in FIG. 4 may be utilized depending on the type of pusher operation which is conducted. Thus it can be seen that the objects of the invention have been fully achieved. Further modifications may be made in the structure shown without departing from the spirit of the invention nor the scope thereof as defined in the appended claim.

What is claimed is:

A push bumper for a vehicle having a frame including a vertically extending frame member at one end portion of said frame, comprising; a bumper structure including a first tubular member supported on said frame member and projecting horizontally outwardly therefrom in the direction of movement of said vehicle, a second tubular member, said tubular members having axially spaced opposed ends, first and second retainer rings respectively connected to the opposed ends of said first and second tubular members, each ring having an inner annular face providing an annulus of a certain diameter, said face extending inwardly toward the axis of said tube to provide an annulus of smaller diameter, the inward extension of said faces of said members being in opposed directions, an axially disposed and axially movable core member within said tubular members, said core member having annular outer faces tapering inwardly toward the annulus of smaller diameter, an annular biscuit-like resilient member supported on and between the surfaces of each said ring and core member and conforming generally thereto, a stop on said core member, said stop having a flange portion engaging one of said biscuit-like resilient members to limit forward longitudinal movement of said core member, and a bumper plate associated with said second tubular member whereby during bumping engagement of said bumper plate said core member is moved longitudinally toward said frame against the resilient restraining action of said resilient members, said stop being engageable to limit the said movement of said core member.

References Cited in the file of this patent
UNITED STATES PATENTS

| | | |
|---|---|---|
| 2,474,919 | Spence | July 5, 1949 |
| 2,755,056 | Hutton | July 17, 1956 |
| 2,858,127 | Moulton | Oct. 28, 1958 |
| 2,878,036 | Simmons | Mar. 17, 1959 |
| 2,919,142 | Winget | Dec. 29, 1959 |
| 2,986,827 | Peterson | June 6, 1961 |
| 2,999,697 | Winget | Sept. 12, 1961 |